US008561879B2

(12) United States Patent
Jol et al.

(10) Patent No.: US 8,561,879 B2
(45) Date of Patent: Oct. 22, 2013

(54) HOTBAR DEVICE AND METHODS FOR ASSEMBLING ELECTRICAL CONTACTS TO ENSURE CO-PLANARITY

(75) Inventors: Eric S. Jol, San Jose, CA (US); Mathias W. Schmidt, San Francisco, CA (US); Edward Siahaan, San Francisco, CA (US); Albert J. Golko, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/346,260

(22) Filed: Jan. 9, 2012

(65) Prior Publication Data

US 2013/0175326 A1 Jul. 11, 2013

(51) Int. Cl.
*B23K 31/02* (2006.01)

(52) U.S. Cl.
USPC ............. 228/179.1; 228/180.1; 228/180.21; 228/245

(58) Field of Classification Search
None
See application file for complete search history.

(56) References Cited

U.S. PATENT DOCUMENTS

| | | | | |
|---|---|---|---|---|
| 3,551,127 A * | 12/1970 | Stoll | ............................. | 65/32.2 |
| 3,646,670 A * | 3/1972 | Maeda et al. | .................. | 29/830 |
| 3,729,698 A * | 4/1973 | Chapman | ........................ | 439/43 |
| 3,791,018 A * | 2/1974 | Johnston et al. | ............ | 228/180.1 |
| 3,896,285 A * | 7/1975 | Delorme | ........................ | 219/80 |
| 4,004,261 A | 1/1977 | Klingenberg | | |
| 4,220,845 A * | 9/1980 | Morreale | ..................... | 219/243 |
| 4,871,319 A | 10/1989 | Babow | | |
| 4,883,214 A * | 11/1989 | Zimmer | ............................ | 228/9 |
| 4,918,277 A * | 4/1990 | Zimmer | ....................... | 219/56.1 |
| 4,987,283 A * | 1/1991 | Beinhaur et al. | ............... | 219/616 |
| 5,281,794 A * | 1/1994 | Uehara et al. | .................. | 219/243 |
| 5,435,378 A * | 7/1995 | Heine et al. | ...................... | 165/64 |
| 5,614,118 A * | 3/1997 | Weber | ............................ | 219/243 |
| 5,915,749 A | 6/1999 | Baldwin | | |
| 5,927,588 A * | 7/1999 | Narui | ............................. | 228/6.2 |
| 5,955,703 A * | 9/1999 | Daly et al. | ................ | 174/117 R |
| 6,062,890 A * | 5/2000 | Pei et al. | ........................ | 439/342 |
| 6,135,781 A * | 10/2000 | Pope et al. | ....................... | 439/59 |
| 6,147,326 A * | 11/2000 | Backlund | ....................... | 219/243 |
| 6,189,769 B1 * | 2/2001 | Kuo | ............................... | 228/205 |
| 6,607,115 B2 * | 8/2003 | Kobayashi et al. | ........... | 228/101 |
| 7,439,731 B2 | 10/2008 | Crafts et al. | | |

(Continued)

OTHER PUBLICATIONS

Invitation to Pay Additional Fees mailed on Apr. 3, 2013 for PCT Patent Application No. PCT/US2013/020548, 8 pages.

(Continued)

*Primary Examiner* — Kiley Stoner
(74) *Attorney, Agent, or Firm* — Kilpatrick Townsend & Stockton LLP

(57) ABSTRACT

Devices and methods for assembling co-planar electrical contacts in a connector are provided herein. In one aspect, an exemplary method of assembly comprises depositing solder in a connector plug enclosure, positioning electrical contacts on the solder deposits, advancing the hotbar toward the enclosure contacting each of the electrical contacts so as to planarize a top surface of each of the electrical contacts with the enclosure and melting the solder with the heated hotbar to solder the electrical contacts to the enclosure. In one aspect, an exemplary hotbar device includes a magnet for releasably coupling the electrical contacts to the hotbar. In another aspect, the hotbar includes metallic portions for heating the electrical contacts and insulated ceramic portions for contacting the enclosure. In another aspect, an electrically conductive hotbar includes side portions that extend away from the bottom heating surface facilitating more uniform current flow through the hotbar.

23 Claims, 14 Drawing Sheets

(56) References Cited

U.S. PATENT DOCUMENTS

| | | |
|---|---|---|
| 7,543,376 B2* | 6/2009 | Yoshino et al. ............... 29/852 |
| 7,642,129 B2 | 1/2010 | Liang et al. |
| 7,892,035 B2* | 2/2011 | Tsai et al. ..................... 439/634 |
| 8,381,966 B2* | 2/2013 | Kumar et al. ............ 228/180.22 |
| 2005/0045696 A1* | 3/2005 | Bolen et al. ................ 228/179.1 |
| 2005/0247759 A1 | 11/2005 | Ice et al. |
| 2006/0128221 A1* | 6/2006 | Yoshikawa et al. ........... 439/607 |
| 2008/0067248 A1* | 3/2008 | Hiew et al. .................... 235/441 |
| 2008/0101025 A1* | 5/2008 | Harris et al. .................. 361/704 |
| 2010/0008054 A1 | 1/2010 | Dotson |
| 2011/0136321 A1 | 6/2011 | Kuroda et al. |
| 2012/0009813 A1* | 1/2012 | Tsai ............................... 439/347 |

OTHER PUBLICATIONS

Unitek Eapro B.V.; "Hot-Bar Reflow Soldering,"; located at http://web.archive.org/web/20080506083947/http://unitekeapro.com/pages.php?id=85; May 6, 2008; 5 pages.
Partial European Search Report mailed on Apr. 3, 2013 for EP Patent Application No. 13150502.6, 7 pages.

* cited by examiner

HOTBAR DEVICE AND METHODS FOR ASSEMBLING ELECTRICAL CONTACTS TO ENSURE CO-PLANARITY

BACKGROUND

Data transfers between devices such as computers and peripheral devices, including portable media devices, have become ubiquitous over the last several years. Music, phone numbers, video, and other data are moved among these devices, often using cables to form electrical pathways for signals that carry information between devices. Such cables are connected to these devices using a connector.

These electrical connectors are typically formed by inserting a connector plug on each end of a data cable into a connector receptacle located on the computer or peripheral device. A typical connector plug includes a distal plug portion, which has one or more electrical contact terminals exposed so as to electrically connect with corresponding contact terminals within a connector receptacle.

In many applications, repeated insertion of a connector plug into a connector receptacle over time may cause wear and tear on the exposed electrical contacts, resulting in a shortened life span of the connector device. When fabricated with a non-uniform delivery profile, slight differences in the position of each electrical contacts may cause unevenly distributed stresses that degrade the performance of the connector. Additionally, an uneven delivery profile between electrical connectors may cause gaps that may result in premature deterioration of the device, accumulation of debris and reduced aesthetic appeal.

SUMMARY

Accordingly, embodiments of the present invention provide methods of assembling improved connector plugs that overcome the drawbacks of many conventional connectors devices described above. In one aspect, the invention allows for improved connector plugs having a plurality of electrical contacts with a uniform delivery profile and an improved aesthetic appearance. In many embodiments, the invention provides a connector plug having a plurality of electrical contacts having exposed top surfaces that are co-planar with each other, and co-planar with a top surface of the connector plug enclosure in which the electrical contacts reside, so as to reduce wear and tear on the electrical contacts during repeated insertion and removal of the plug connector from a corresponding connector receptacle. Typically, embodiments include methods that allow for soldering of a plurality of electrical contacts into a connector plug enclosure while maintaining co-planarity of the exposed electrical contact surfaces with each other, and typically with the outer connector plug surface. Embodiments also provide means for precisely positioning each of the electrical contacts at desired locations within the connector plug enclosure for soldering within the plug enclosure.

In one aspect, the present invention includes a method for assembling electrical contacts in a plug enclosure comprising: contacting a bottom surface of each of a plurality of electrical contacts with at least one of a plurality of solder deposits; advancing a hotbar toward the plug enclosure so that a bottom planar surface of the hotbar abuts against a top surface of each of the plurality of electrical contacts so as to planarize the top surfaces of the electrical contacts while being positioned within the enclosure; heating the hotbar to at least a melting temperature of the solder; melting the solder deposit with the heated hotbar through the electrical contacts so as to solder the electrical contacts within the enclosure; and cooling the melted solder while the bottom planar surface of the hotbar remains abutted against the top surfaces of the plurality of electrical contacts so that the top surfaces of the electrical contacts remain co-planar when the hotbar is removed. Generally, the hotbar is advanced until it abuts against a top surface of the enclosure so that the top surfaces of the electrical contacts are co-planar with the top surface of the enclosure. In some embodiments, solder may be deposited on a PCB insert within the enclosure prior to advancing the hotbar against the electrical contacts. In other embodiments, the electrical contacts are releasably attached to the bottom planar surface of the hotbar, such as with a magnetic force. Typically, the electrical contacts are aligned as desired using a frame, which may remain within the assembly after soldering or removed before or after soldering.

In another aspect, the present invention provides a hotbar for use in assembling co-planar electrical contacts in a connector. The hotbar may includes a means for releasably attaching the electrical contacts, such as through the use of a magnet. In some embodiments, the hotbar includes one or more heating portions, such as metal portions, for heating and soldering the electrical contacts, and non-heating portions, such as insulating or ceramic portions, for contacting the enclosure and preventing unnecessary heat loss, inefficiency or potential thermal damage to adjacent components. In other embodiments, the hotbar has a substantial dimension orthogonal to the bottom heating surface, such as at least two side portions that extend a distance away from the bottom heating portions which act as an anode and cathode, respectively, so as to improve the uniformity of current flow through an electrically conductive hotbar.

Various embodiments of the present invention may incorporate one or more of these and the other features described herein. A better understanding of the nature and advantages of the present invention may be gained by reference to the following detailed description and the accompanying drawings.

DETAILED DESCRIPTION

Embodiments of the present invention generally relate to assembly of electrical contacts, and in particular connector plugs. More specifically, the present invention relates to assembly of connector plugs having multiple electrical contacts that are co-planar with each other, and typically with an outer surface of an enclosure in which the electrical contacts are attached. In many embodiments, the multiple electrical contacts are assembled within a plug enclosure so that an exposed top surface of each electrical contact is co-planar with the top surface of the plug enclosure. In another aspect of the invention, hot bars for use with such methods are provided.

Accordingly, the present invention provides methods for assembling electrical contacts within a connector plug so as to ensure co-planarity of the electrical contacts while maintaining the structural integrity of the connector, and further providing for an improved aesthetic appearance. Examples of the above described connector plugs, the claimed methods for assembly, and the claimed hot bars for use with such methods are shown in the following figures. These figures, as with the other figures herein, are shown for illustrative purposes and do not limit either the possible embodiments of the present invention or the claims.

Figure 1:
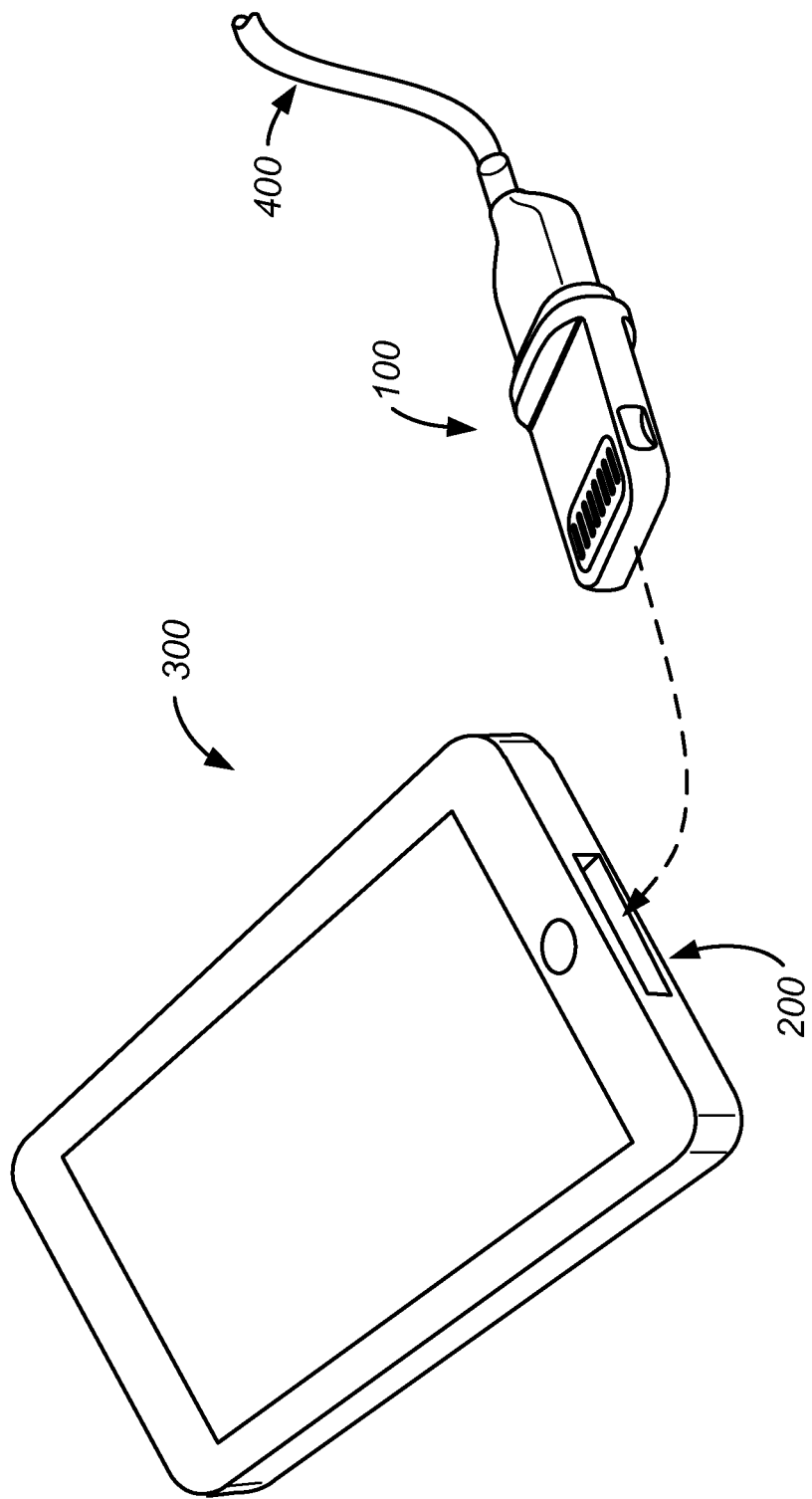
FIG. 1 illustrates a media device and associated data cord, which includes a connector plug that may be assembled using embodiments of the present invention.

FIG. 1 illustrates an exemplary connector plug 100, the assembly of which may be improved by incorporation of embodiments of the present invention. This figure shows a conventional media device 300 and associate data cord 400 that connect using the connector plug 100 of the data cord and the connector receptacle 200 of the media device. By inserting the connector plug 100 within the connector receptacle 200 of the media device, a group of electrical contacts on the connector plug engage a corresponding group of electrical contacts within the receptacle. Although the electrical contacts assembled in accordance with the present invention are shown disposed in a connector plug 100 of data cable 400 for use with a media device, the present invention may be used in any of a variety of devices or components having electrical contacts, including but not limited to the tongue of a connector receptacle. Since generally the connector 100 is connected and disconnected frequently over time, any irregularities between the interfacing surfaces of the connector plug 100 and receptacle 200 may create friction and cause wear-and-tear on the connector components, thereby degrading the performance of the connector and reducing the life-span of the connector device. To prevent these irregularities and wear-and-tear between components and ensure connectivity between corresponding contact surfaces, it is advantageous to assemble the connector plug 100 so that each of the exposed contact surfaces of the electrical connectors is co-planar with each other, as well as with the surrounding outer surface of the connector plug enclosure. While various methods can be used to provide co-planarity (e.g., shearing or grinding down uneven surfaces after assembly, manufacturing electrical contact assembly separately from the plug assembly), conventional methods have not provided a simple, reliable, consistent and efficient process by which co-planarity can be achieved during assembly of the connector plug.

Figure 2:
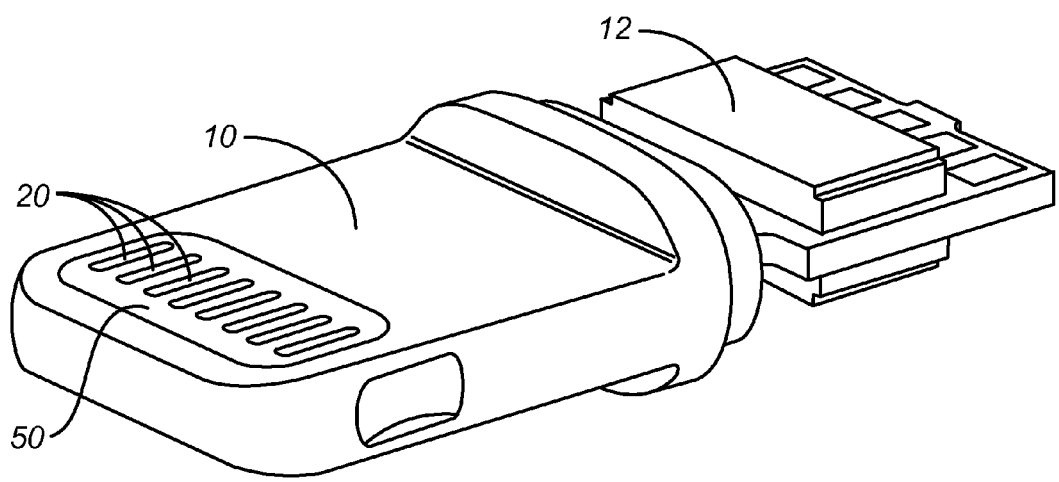
FIG. 2 illustrates an exemplary connector plug assembled in accordance with many embodiments of the present invention.

FIG. 2 illustrates the exemplary connector plug 100 of FIG. 1 in greater detail. The connector plug 100 includes an enclosure that houses the group of parallel electrical contacts and associated components. In one embodiment, the enclosure is a structural member having a metal shell and a hollowed interior in which electrical components of the connector can be inserted, sometimes referred to as a ground ring. As can be appreciated from the figure, the components of the connector plug are relatively small and assembling the electrical contacts within the plug enclosure while maintaining the proper position of each electrical contact and co-planarity of the contact surfaces can be a complex task. Any minor irregularities during assembly of the connector that cause the electrical contacts to not be co-planar can be detrimental to the operation of the connector. For example, if some of the flat exposed surfaces of the electrical contacts extend above the desired plane, this may cause friction and interference, which may lead to poor fit between the plug and receptacle, separation of the electrical contacts from the connector plug, and eventual break-down of the connector components. Alternatively, if some of the electrical contacts are below the desired plane, the electrical contacts may have a poor connection with the corresponding contact surface in the receptacle, or in some cases not even contact the corresponding surface at all, thereby rendering the connector unusable. The methods and devices provided herein allow for assembly of such connector plugs in a simple, consistent, and efficient process that ensures that exposed contacting surfaces of the connector are co-planar so as to avoid the above described difficulties. While the exemplary connector plug shown in the figures herein depicts a connector having a row of elongate electrical contacts, one of skill in the art would appreciate that the methods and apparatus described herein could be used in any connector or device where co-planarity of component surfaces is desired.

In an exemplary embodiment, the method of assembling a connector plug having co-planar electrical contacts includes depositing solder deposits at the desired electrical contact locations on a PCB surface within the plug enclosure, positioning the group of electrical contact so that a bottom surface of each electrical contact contacts at least one solder deposit, heating a hotbar solder to at least a temperature sufficient to melt the solder, advancing the hotbar toward the top surfaces of the group of electrical contacts so as to planarize the top surfaces with each other and melt the solder deposits in the process, and then cooling the melted solder so that the group of electrical contacts are secured within the enclosure in the desired positions, the top surface of each being co-planar. Generally, the method includes advancing the hotbar against the top surfaces of the electrical contacts until the hotbar abuts against an outer surface of the enclosure surrounding the electrical contacts, thereby ensuring that the top surfaces of the electrical contacts are co-planar with each other as well as the top outer surface of the plug enclosure. The hotbar is typically a force limited hotbar, which does not required advancement of a particular distance, thereby allowing use of the hotbar on various types of plug connectors with enclosures or ground ring having different dimensions.

In many embodiments, the hotbar is heated before advancing the hotbar toward the enclosure 10. Typically, the hotbar is heated until it reaches its steady state temperature, which is often about 300-320 degrees Celsius. The reflow temperature of solder is typically about 230 degrees Celsius. In one aspect, the hotbar is heated relatively slowly, such as over a period anywhere from 5 to 20 seconds, typically 10-15 seconds. Heating the hotbar slowly avoids the potential for damage to plastics or other adjacent parts of the assembly. In one embodiment, the hotbar temperature is increased to a temperature below the reflow temperature, often just below the reflow temperature, and held at that temperature for a dwell time, after which it is increased to a temperature above the reflow temperature. This may occur before or after contacting the electrical contacts with the hotbar, or before, during or after advancing of the hotbar 30 toward the enclosure 10 as describe above.

FIGS. 3A-3E illustrate the various components of an exemplary connector plug during assembly, although one of skill in the art would appreciate that these components may differ somewhat in alternative connector plugs and methods of assembly.

Figure 3A:
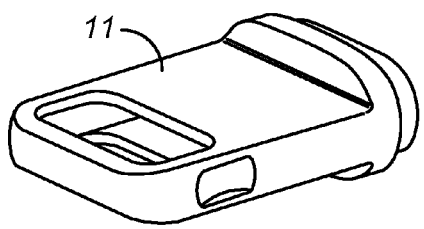
FIGS. 3A-3E illustrate components of an exemplary connector plug as assembled in accordance with embodiments of the present invention.

FIG. 3A illustrates the connector plug enclosure shell 11 that can be made from metal or another suitable hard conductive material and sometimes referred to as a ground ring. The ground ring may be made from stainless steel, brass, or any number of other suitable materials, and includes an opening for an inserted printed circuit board (PCB) components as well as electrical contacts within. Although the outer top surface of the enclosure shell 11, near where the electrical contacts are inserted, is typically flat, as shown, it may also be curved or angled in other embodiments.

Figure 3B:
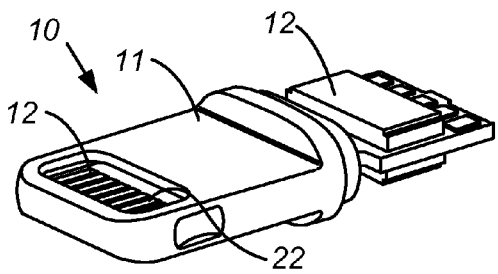

FIG. 3B illustrates the connector plug enclosure 10 having a PCB component 12 inserted within the enclosure shell 11. The PCB insert 12 typically extends through the interior of the enclosure shell 11 and through a rear portion for attachment to wires within the associated data cable. The PCB insert 12 may be fixedly attached to the enclosure 10 according to any number of suitable means, including an interference fit, pins, soldering, or adhesive bonding. The portion of the PCB insert 12 extending through the opening in the enclosure 10 includes electrical contact points corresponding to individual wires within the data cable, which are typically soldered to the electrical contacts of the plug to establish connectivity between the electrical contacts and the data cord. In soldering parts together, solder is deposited on one or both of the surfaces to be soldered together. The PCB board of the insert 12 has a bonding pad for each of the contacts 20. Solder provides two functions: (1) providing electrical contact between each of external contacts 20 and its corresponding bonding pad; and (2) acting as a spacer for the contacts via the hotbar melting/hardening process described herein. As shown in FIG. 3B, the solder is typically deposited on the PCB insert 12 at the desired electrical contact location to facilitate soldering of an electrical contact 20 to the PCB insert 12 of the enclosure 10. To ensure the electrical contacts 20 are properly positioned at the desired electrical contact points for soldering, a frame or alignment device may be used.

Figure 3C:
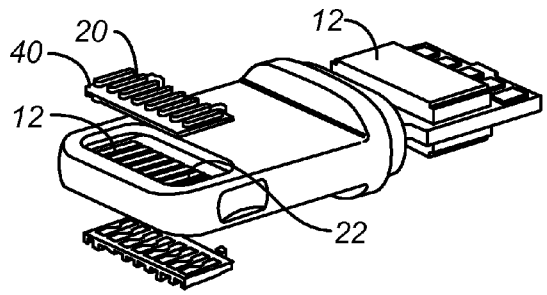

FIG. 3C illustrates the above assembly as well as a group of electrical contacts 20 positioned in a dielectric frame 40 before insertion into the opening of the enclosure 10. The frame 40 may use any number of means for aligning the electrical contacts 20 in the proper positions relative to each other and the enclosure 10, including dimensioning, pins, holes, etc. The frame 40 aligns the electrical contacts by engaging the sides of the electrical contacts while allowing for contact between the bottom of the electrical contacts 20 and the solder deposits 22 so as to facilitate soldering of the contacts 20 to the enclosure 10 and maintain electrical contact therebetween.

The ground ring is typically fabricated from one or more metals, such as stainless steel, brass, or other suitable metal. The electrical contacts 20 are metal, typically comprising one or more layers, such as a stainless steel, copper alloy, or phosphor bronze, and may include additional coatings such as palladium, nickel, and gold platings. The solder is typically a pliable paste than can be easily deposited on a surface of the PCB insert 12 or the bottom surface of the electrical contact 20 prior to soldering. Generally, the solder is a combination of materials, which may include tin, silver and copper, and additives to facilitate soldering of the contacts to PCB. The solder deposit 22 is pliable during assembly or when melted such that the electrical contact 20 can be pressed against the solder deposit 22 until a top surface of the contact 20 is coplanar with the surrounding contacts 20.

Figure 3D:
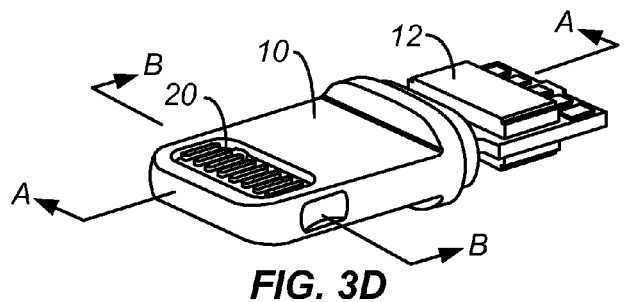

FIG. 3D illustrates the enclosure 10 with the group of electrical contacts 20 positioned within using the frame 40. Typically, the frame 40, when used, remains within the enclosure 10 after soldering of the contacts 20 within the enclosure 10, however, in some embodiments, the frame 40 may be removed before or after soldering. Once the electrical contacts 20 are positioned as desired within the enclosure 10 as shown in FIG. 3D, a heated hot bar (not shown) is advanced toward the enclosure 10 so as to contact the top surfaces of the electrical contacts 20 and planarize the contacts while concurrently melting the solder so as to solder and electrically connect the contacts with the PCB insert 12 in the enclosure 10. During this process, the hot bar is advanced against the top surface of the enclosure 10 so that the top surfaces of the electrical contacts 20 are flush with the outer top surface of the enclosure 10 prior to the overmold process of FIG. 3E.

Figure 3E:
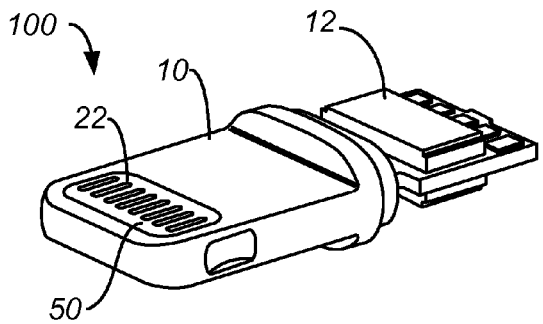

FIG. 3E illustrates the connector plug 100 after soldering of the group of electrical contacts 20 within the enclosure 10. After soldering, the space between the electrical contacts 20 and the edge of the opening in the enclosure 10 may be overmolded, usually with a nylon or polymer material, which protects the electrical contacts and improves the aesthetic appearance of the connector. FIG. 3E also depicts the cross-sections A-A and B-B, which correspond to the viewpoints in subsequent FIGS. 4A-6D.

Figure 4A:
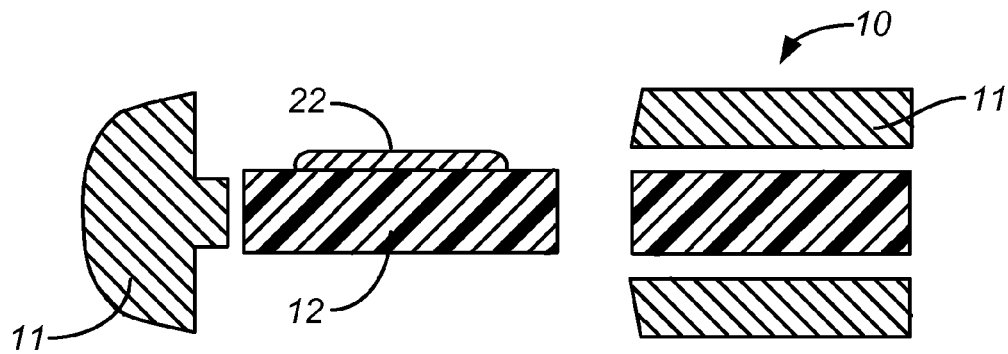
FIGS. 4A-4C illustrate an alternate cross-sectional view of an exemplary connector plug as assembled in accordance with methods of the present invention.
Figure 4B:
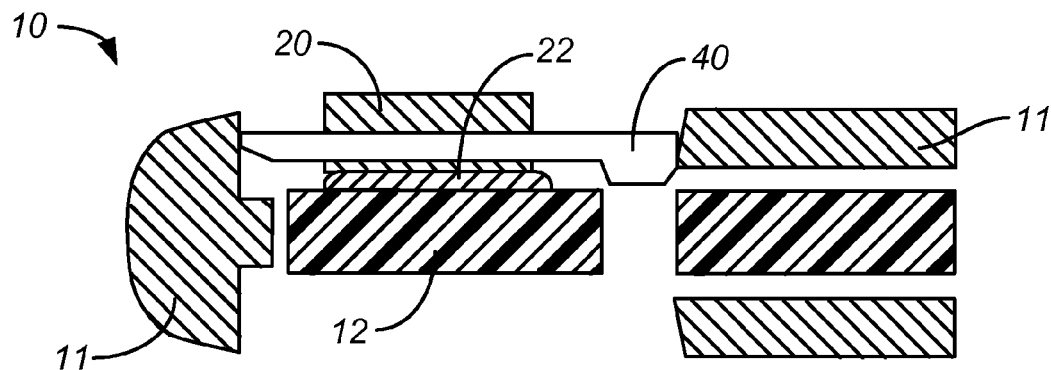
Figure 4C:
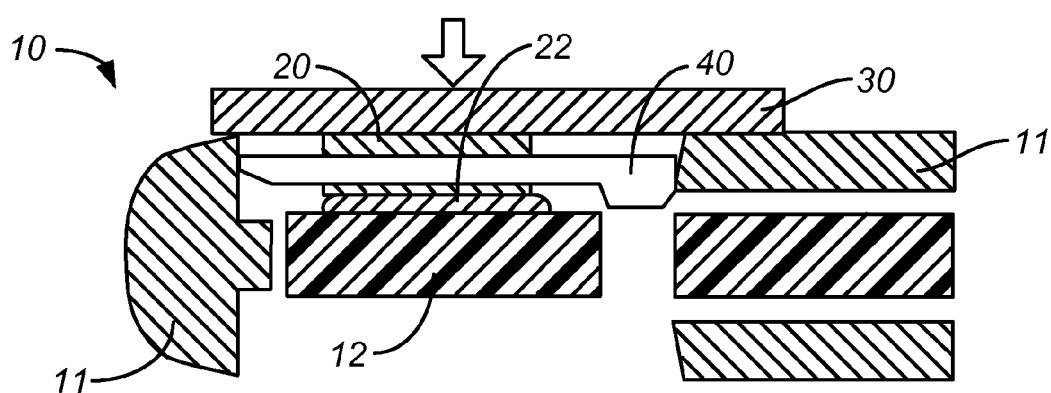

FIGS. 4A-4C illustrate sequential steps of an exemplary method of assembly. FIG. 4A depicts the enclosure 10 as it would appear along cross-section A-A. A line of solder 22 has been deposited on the PCB insert 12 at a location where a connection with the electrical contact is desired. FIG. 4B depicts a frame 40 having an electrical contact 20 positioned within. The alignment frame 40 is dimensioned so as to be fittingly received within the opening of the enclosure so that when inserted, each of the group of electrical contacts is positioned with the desired alignment and location for soldering. As shown in FIG. 4B, when the frame 40 is placed within the opening, the electrical contact 20 floats on top of the solder deposit 22 on the PCB insert such that the top surface of the electrical contact is above the surrounding top surface of the enclosure. Generally, a group of solder deposits 22 on the PCB insert 20 are deposited at locations on the PCB insert 12 corresponding to the positions of the group of electrical contacts 20 to be soldered thereon. As each electrical contact is inserted, the bottom surface of the electrical contact 20 contacts at least one of the group of solder deposits. In this embodiment, the electrical contacts are "inserted" within the enclosure at the same time via frame 40.

FIG. 4C depicts a heated hotbar 30 having a bottom planar surface 31 being advanced toward the enclosure so that the bottom planar surface 31 contacts each of the top surfaces of the group of electrical contacts 20 thereby planarizing the top surfaces so as to be co-planar. Although in this embodiment, the planar surface is flat, in various other embodiments, the plane may be curved and/or variable. As the hotbar 30 advances, the electrical contacts 20 are advanced toward the PCB insert 12 pressing against the pliable solder deposit 22 concurrently melting the solder deposit 22 to facilitate soldering of the electrical contacts 20 to the enclosure 10. As can be seen, the solder deposit 22 is usually compressed as the electrical contact 20 is advanced by the hotbar 30. Typically, the hotbar 30 is advanced until the bottom planar surface 31 abuts against a top outer surface of the enclosure surrounding the electrical contacts so that the electrical contact surfaces are coplanar with the top surface of the enclosure 10. The melted solder 22 is then cooled, either by passively allowing the hotbar to cool or through active cooling methods, until the solder is sufficiently solidified so that the electrical contacts 20 remain co-planar when the hot bar is removed.

Figure 5A:
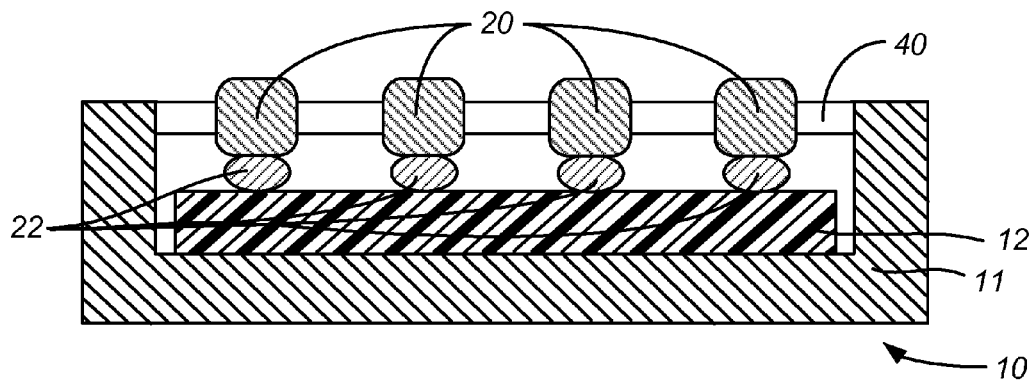
FIGS. 5A-5E illustrate a cross-sectional view of an exemplary connector plug as assembled in accordance with methods of the present invention.
Figure 5B:
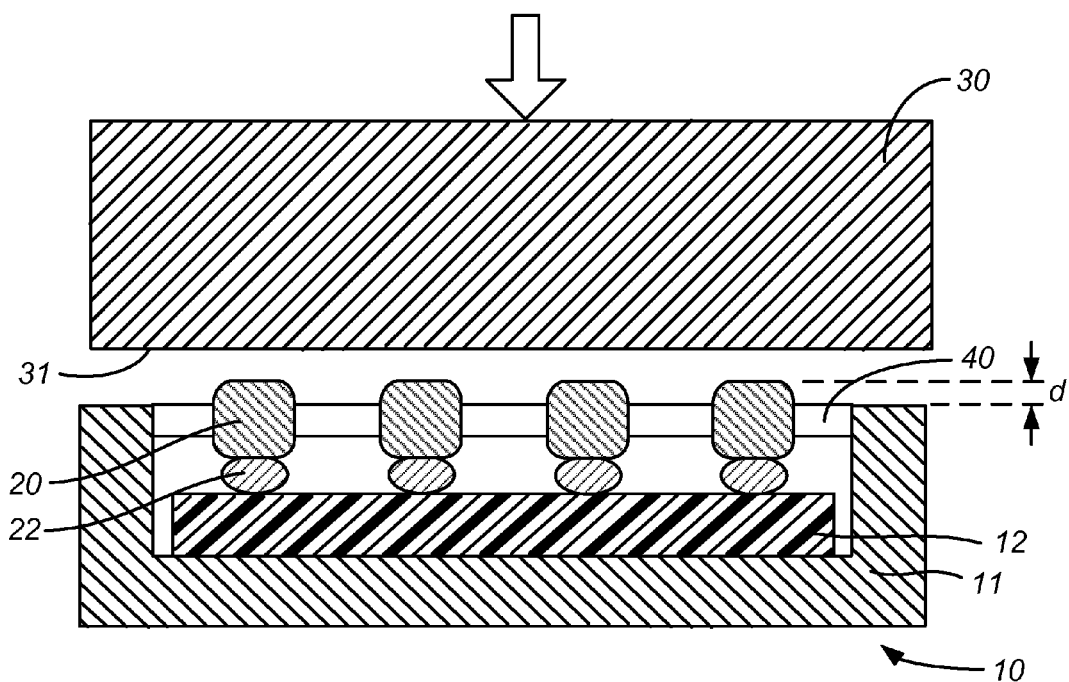

FIGS. 5A-5E illustrate sequential steps of a similar method of assembly as described in FIGS. 4A-4C, as shown along cross-section B-B. FIG. 5A depicts a group of electrical contacts 20 positioned in a frame 40 positioned within an enclosure 10 having solder deposits 22 on the PCB insert 12 within. As can be seen, each of the electrical contacts 20 contacts and floats on the top of a corresponding solder deposit 12. FIG. 5B shows a heated hotbar 30 having a bottom planar surface 31 being advanced toward the enclosure 10. Typically, the hotbar 30 is heated before being advanced toward and contacting the electrical contacts 20, although in some embodiments, it may be heated after or during advancement. The hotbar 30 is heated to at least a temperature sufficient to melt the solder deposit 22 so that the hotbar 30 heats the solder deposit 22 through the electrical contacts. The hotbar 30 may be metal, such as stainless steel, or any material suitable for use as a hotbar to melt solder as described above. As can be seen in FIG. 5B, the top surface of the electrical contacts 20 extend above the top surface of the enclosure by a distance (d).

Figure 5C:
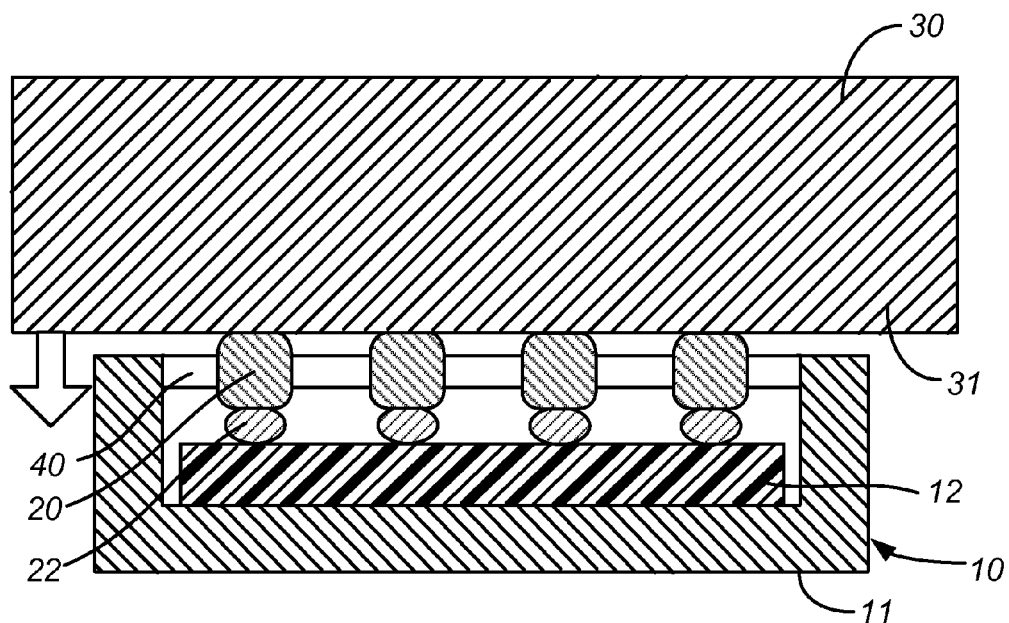
Figure 5D:
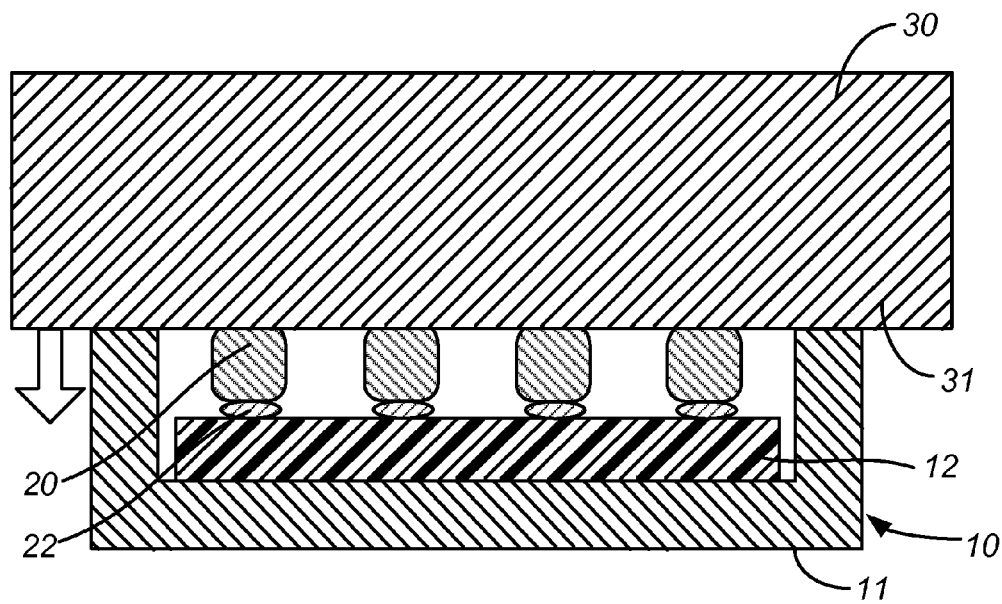
Figure 5E:
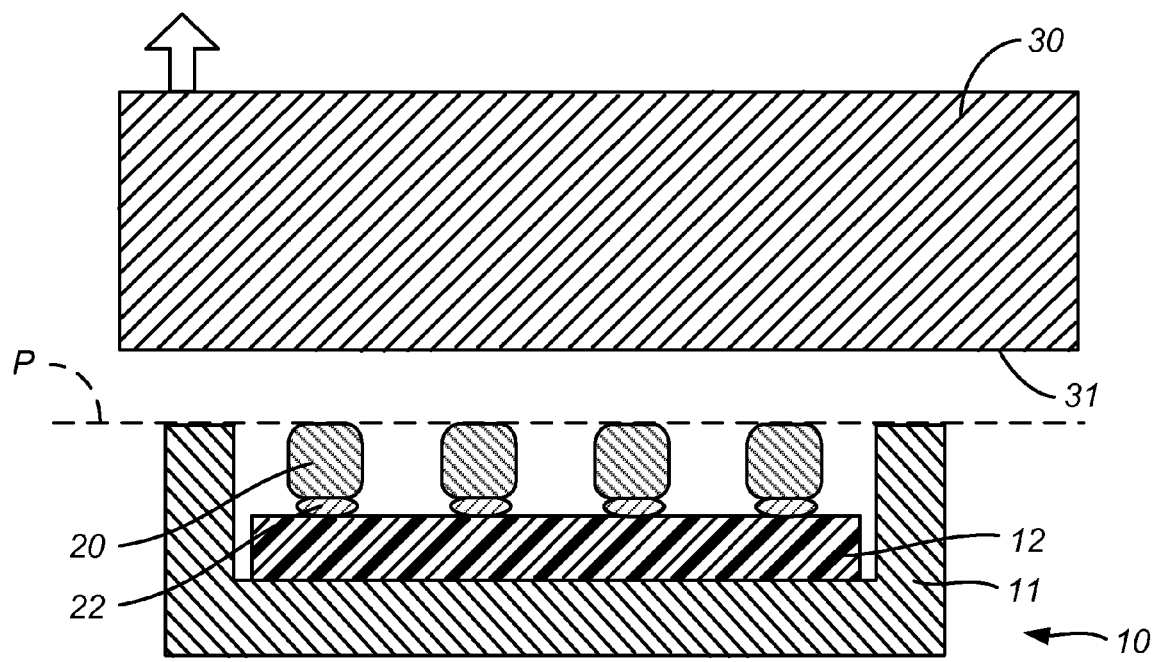

FIG. 5C shows hotbar 30 as it is advanced toward the electrical contacts 20 within the enclosure 10. Advancing the hotbar 30 causes the hotbar 30 to contact each of the electrical contacts thereby causing the top surface of each contact 20 to be co-planar with each other. Once the hotbar 30 contacts the electrical contacts 20, heat transfer through the electrical contacts heats the solder deposits 22 to at least a temperature sufficient to melt the solder deposits 22 thereby soldering each electrical contact 22 to the PCB insert 12, which electrically couples each electrical contact 22 to a wire within the cable through the PCB insert 12. As can be seen, the frame 40 remains within the enclosure 10 as the hotbar 30 is being advanced. The hotbar 30 is then advanced toward the enclosure 10 until the bottom planar surface 31 abuts against the top outer surface of the enclosure 10 so that each top surface is co-planar, as shown in FIG. 5D. Generally, the hotbar 30 remains abutted in this position and the solder deposits 20 are allowed to cool until the electrical contacts 20 are sufficiently stabilized so that the hotbar 30 can be removed. Once sufficient cooled, the hotbar 30 is removed, as in FIG. 5E, after which the electrical contacts 20 remain attached to enclosure 10, the top surfaces of each being co-planar.

In an exemplary method of assembling electrical contacts, a connector enclosure having an opening sized to accept the electrical contacts is provided. The electrical contacts are supported within a dielectric frame. A printed circuit board having a group of bonding pads corresponding to the electrical contacts is inserted within the connector enclosure so that the bonding pads are positioned within the opening. Solder is deposited on each of the bonding pads, and the dielectric frame supporting the electrical contacts is placed within the opening so that a bottom surface of each of the electrical contacts comes in contact with the solder deposited over its corresponding bonding pad. The hotbar is advanced toward the plug enclosure so that a bottom planar surface of the hotbar abuts against a top surface of each of the electrical contacts and an outer surface of the connector enclosure so as to planarize the top surfaces of the electrical contacts with each other and with the outer surface of the enclosure. The hotbar is heated to at least a melting temperature of the solder to melt the solder so as to solder each electrical contact with its corresponding bonding pad within the enclosure opening. The melted solder is then allowed to cool while the bottom planar surface of the hotbar remains abutted against the top surfaces of the electrical contacts so that the top surfaces of the electrical contacts remain co-planar when the hotbar is removed. Typically, after the electrical contacts are soldered and the hot bar removed, an overmold is applied within the opening between each adjacent contact as well as between the contacts and surrounding connector enclosure so that an outer surface of the overmolding is flush with the top surface of the electrical contacts and with the outer surface of the connector enclosure. In many embodiments, the connector enclosure extends from a first side to a second, opposite side of the enclosure and the printed circuit board includes a first set of bonding pads on a first of the board and a second set of bonding pads on the second side of the board. The printed circuit board is inserted within the enclosure so that both first and second sets of bonding are aligned within the opening. Solder is deposited on both first and second sets, on which corresponding electrical contacts are placed. Both first and second sets of bonding pads are then soldered to the corresponding electrical contacts with the heated hot bar, which is also used to planarize the electrical contacts as described above.

In some embodiments, the method includes a means by which the electrical contacts can be releasably attached to the bottom surface of the hotbar. In some cases, melting of the solder may during soldering may inadvertently allow one or more electrical contacts to fall below the bottom planar surface. Releasably attaching the top surface of each of the electrical contacts 20 to the bottom planar surface 31 of the hot bar ensures that each top surface remains co-planar during the soldering process by preventing one or more electrical contacts from falling below the desired plane. The electrical contacts 20 may be releasably attached to the hotbar 30 in a variety of ways, including but not limited to the use of a magnetic force, the force of gravity, or an adhesive.

Figure 6A:
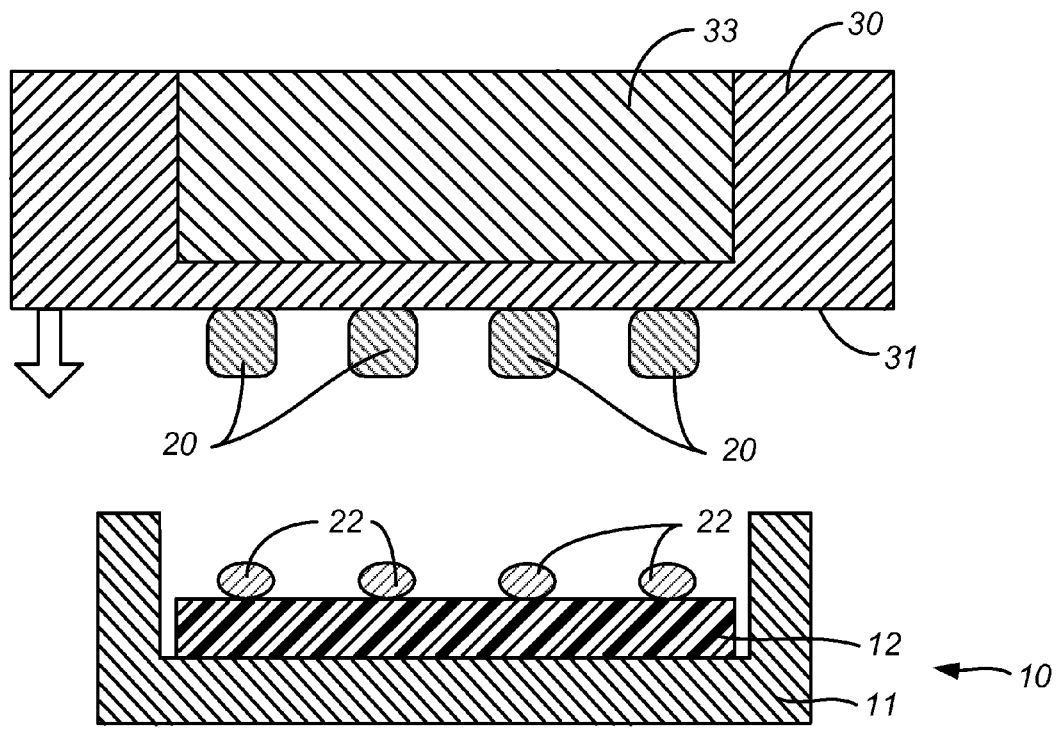
FIGS. 6A-6D illustrate a cross-sectional view of an exemplary connector plug as assembled in accordance with methods of the present invention.

FIG. 6A illustrates a method of assembling electrical contacts according to an embodiment of the present invention in which the electrical contacts 20 are releasably attached to the bottom planar surface 31 of the hotbar 30 using a magnet 33. The magnet 33 may be an electro-magnet, so that it can be turned off to release the contacts 20, or a permanent magnet that is removable or is weak enough that the magnetic force that is less than the force of the solder bond. In this embodiment, rather than positioning the electrical contacts 20 within the enclosure 10 before soldering, the electrical contacts 20 can be positioned on the bottom planar surface 10 by releasably attaching the contacts 20 in the desired alignment. A frame (not shown) can be used to ensure proper alignment on the hotbar 30, and may removed before soldering, or remain within the enclosure after soldering, as described above. Once the electrical contacts 20 are releasably attached to the hotbar 30, the hotbar 30 can be heated as described previously to facilitate soldering of the contact 20 to the enclosure 10.

Figure 6B:
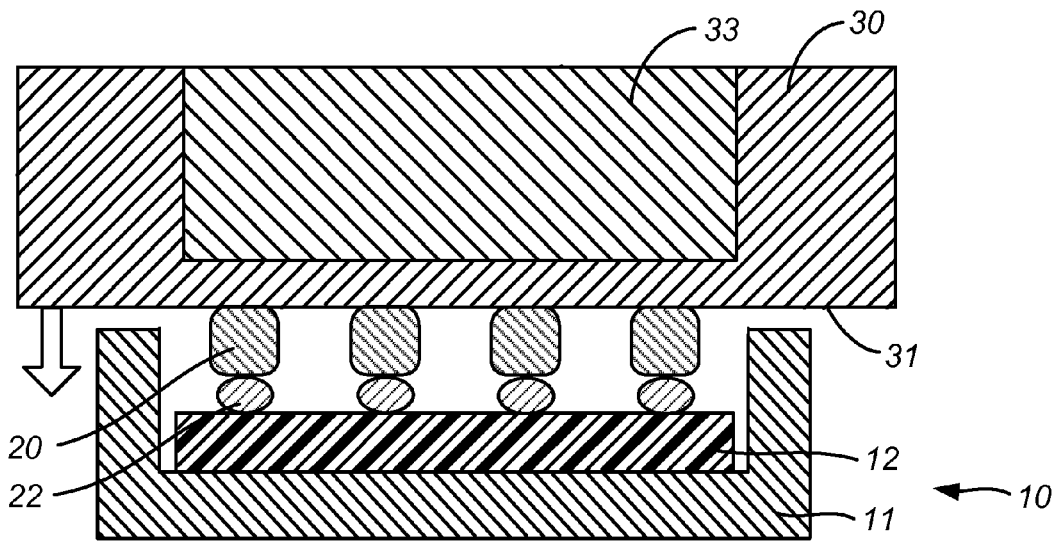
Figure 6C:
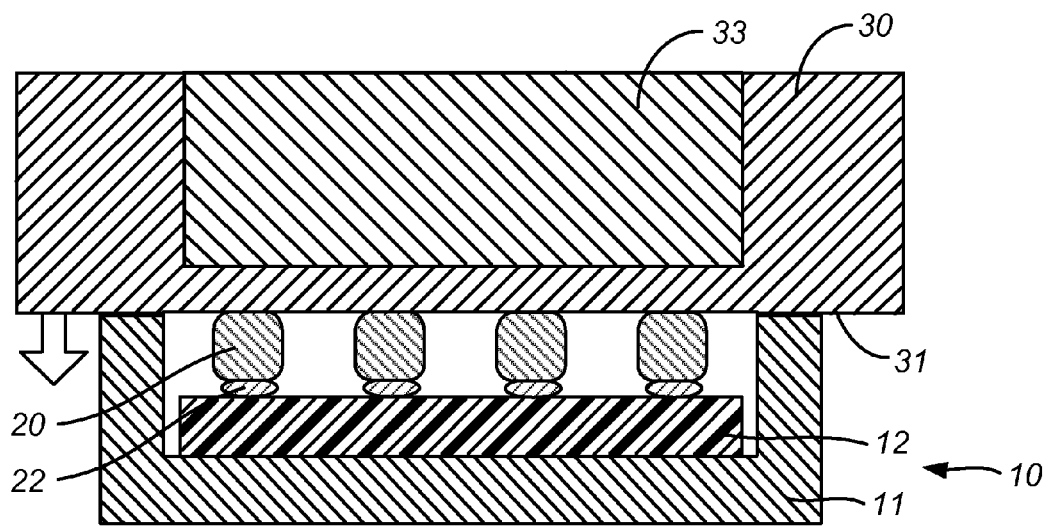
Figure 6D:
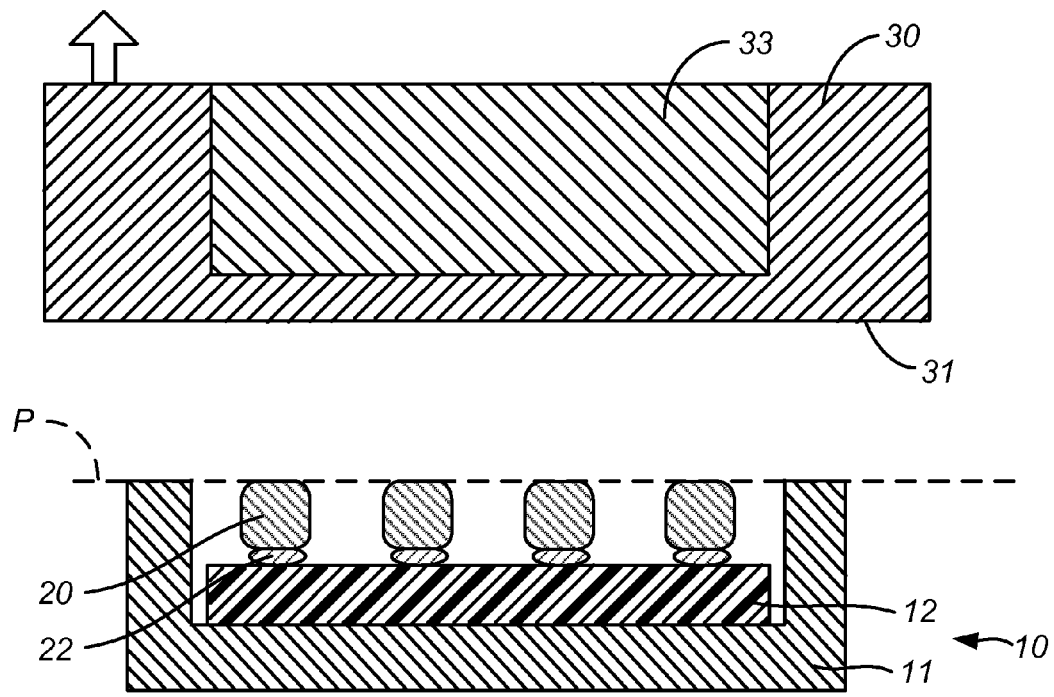

FIG. 6B illustrates the hotbar being advanced toward the enclosure so that a bottom surface of each of the electrical contacts 20 contacts a corresponding solder deposit 22 on the PCB insert 12. Although in the illustrated embodiment, the solder was deposited in the enclosure 10 prior to soldering, it is appreciated that the solder 22 could be deposited directly on the bottom surface of the electrical contact 20 before soldering. As shown in FIG. 6B, the hotbar 30 can be advanced, as described above, until the bottom planar surface contacts the top surface of the enclosure 10 so that each top surface is co-planar. After sufficient cooling of the melted solder deposit 22, the electrical contacts can be released, either by removing the magnetic force (as in the case of a removable permanent magnet, or an electromagnet) or simply by retracting the hotbar 30 (as in the case of a weak magnetic force). As can be seen in FIG. 6B, the top surfaces of each of the electrical contacts 20 and enclosure 10 remain co-planar.

Figure 7:
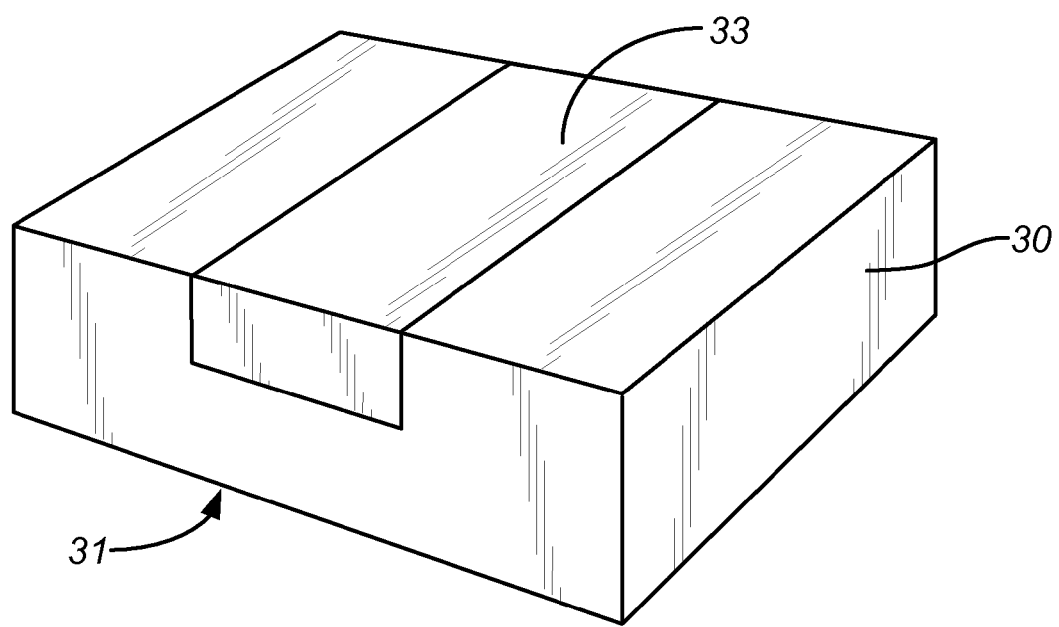
FIGS. 7-9 illustrate an exemplary hot bar, in accordance with many embodiments of the present invention.

FIG. 7 shows hotbar devices 30 having a magnet 33, in accordance with many embodiments of the present invention. The magnet 33 may include a variety of differing types of magnets or a combination thereof. For example, the magnet 33 may comprises one or more magnets of varying strength, one or more removable magnets, or a magnet that is weaker than the solder bond between the electrical contacts 20 and enclosure 10 so that removing the hotbar 30 releases the electrical contacts 20. Alternatively, the magnet may include one or more electro-magnets that can simply be de-activated once the solder is sufficiently solidified so that the electrical contacts 20 can be easily released.

Figure 8A:
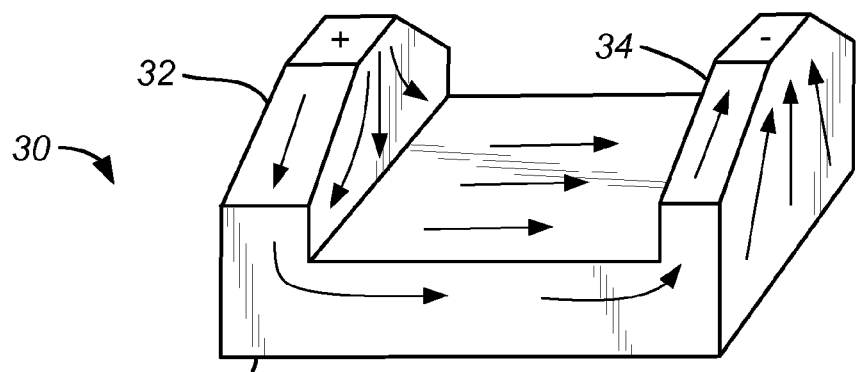
Figure 8B:
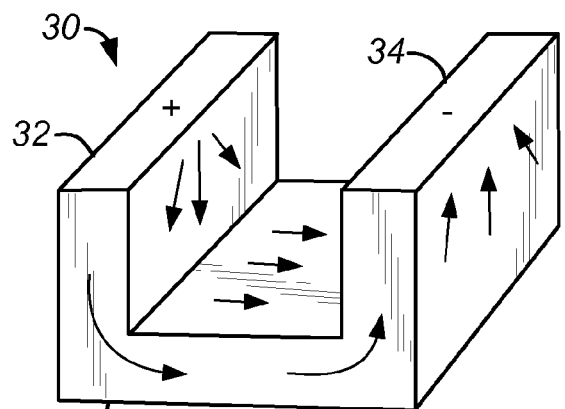
Figure 8C:
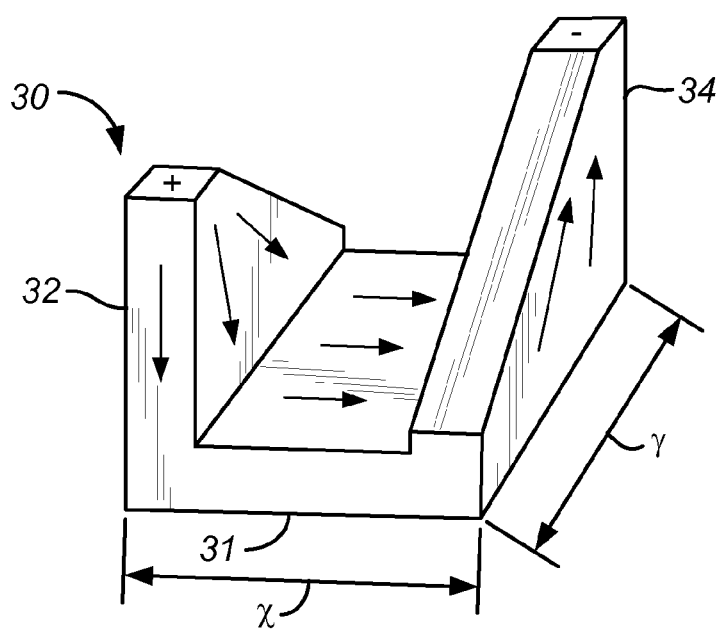

In some embodiments, the hotbar 30 may include a three-dimensional hotbar 30 having a substantial thickness so as to improve uniformity of heating, typically in a hotbar 30 that heats using electrical conductivity. Such a hotbar 30 includes an anode portion 32 and cathode 34, providing the source and outlet of the current flow, respectfully, each of the anode and cathode protruding a sufficient distance away from the heating bottom surface to provide improved uniformity of current flow, as shown in each of FIGS. 8A-8C. In many embodiments, the hotbar 30 includes at least two side portions, 32 and 34, one side acting as a cathode and the other side acting as an anode, each side portion extending a distance away from and perpendicular to the bottom heating surface 31. The bottom heating surface 31 is rectangular and each side portion is an opposing side of the rectangular bottom surface. In some embodiments, each side portion extends at least half of a minor dimension, such as x for example, of the bottom heating surface. In other embodiments, each side portions extends at least half of a major dimension, such as y for example, of the bottom heating surface. The side portions may also include a variety of different shapes and dimension to improve current flow through the hotbar 30, as shown in FIGS. 8A-8C.

Figure 9:
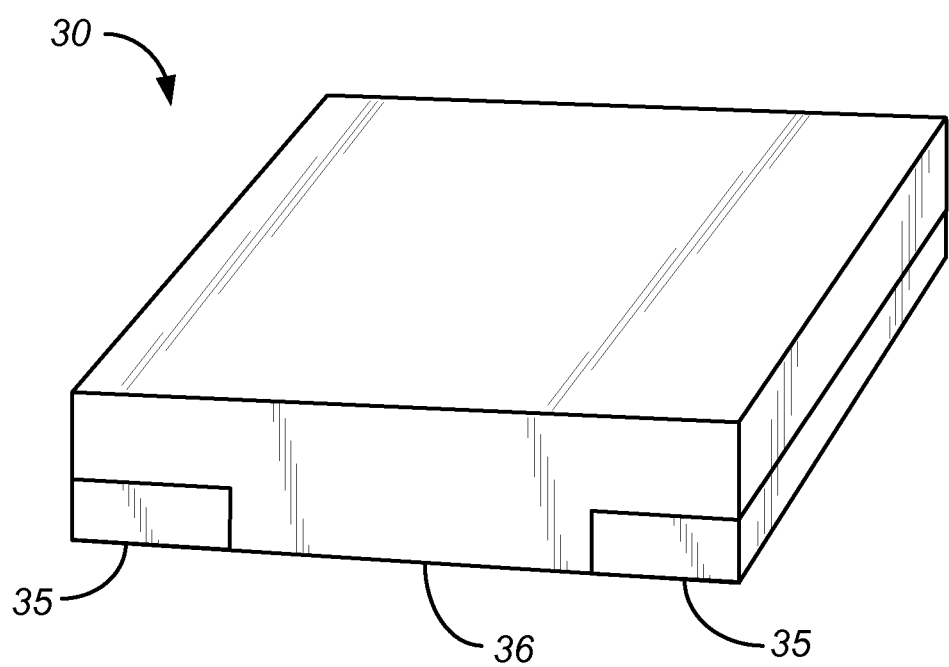

In another aspect, as shown in FIG. 9, the hotbar 30 may include one or more heating portions 36 for contacting and heating electrical contacts 20 to facilitate soldering and one or more non-heating portions 35 or insulated portions for contacting the top surface of the enclosure 10 surrounding the electrical contacts 20. A hotbar 30 having such non-heating portions 35 is advantageous as these portions avoid dumping heat into the enclosure 10 or ground ring during the soldering process. Additionally, the non-heating portions 35 improve the efficiency of the soldering process by reducing the amount of heat transferred through the hotbar 30. Typically, the heating portion 36 comprises a metal and the non-heating portion 35 a ceramic or polymer.

Figure 10:
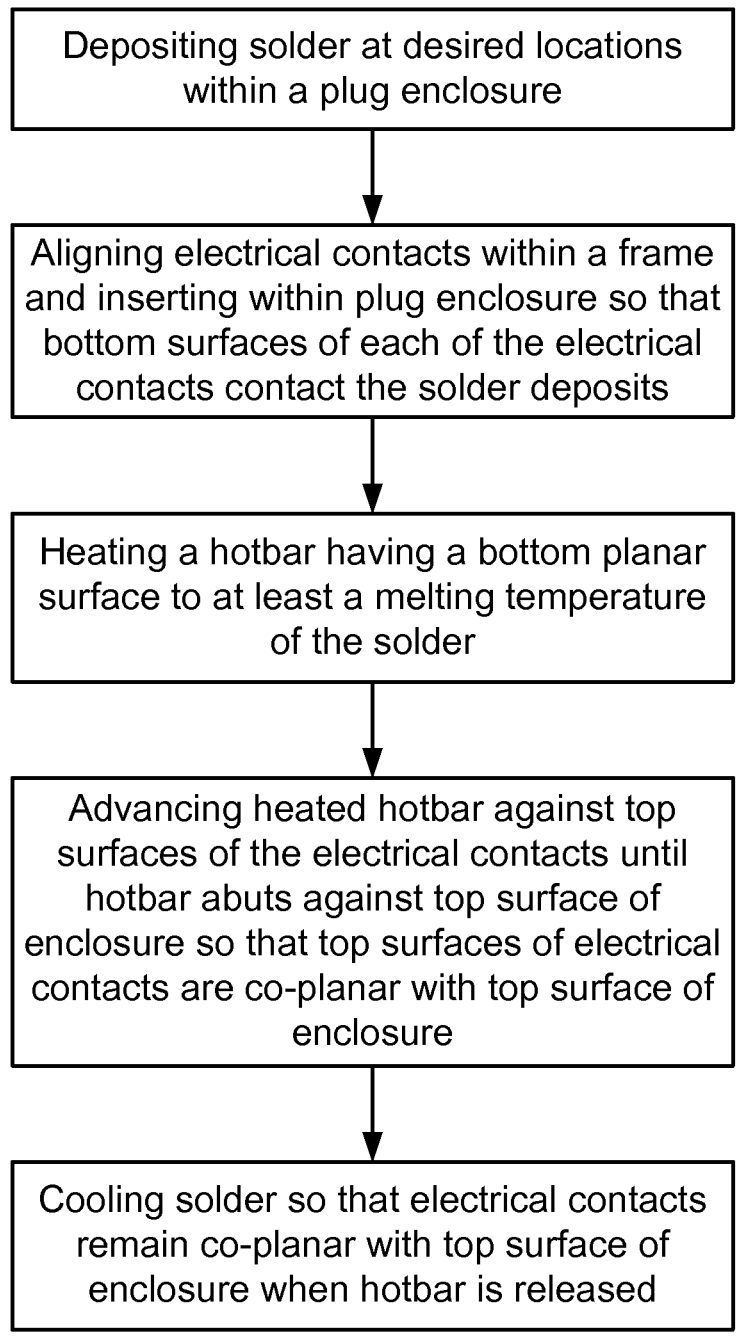
FIGS. 10-11 depict flow charts of exemplary assembly methods, in accordance with many embodiments of the present invention.
Figure 11:
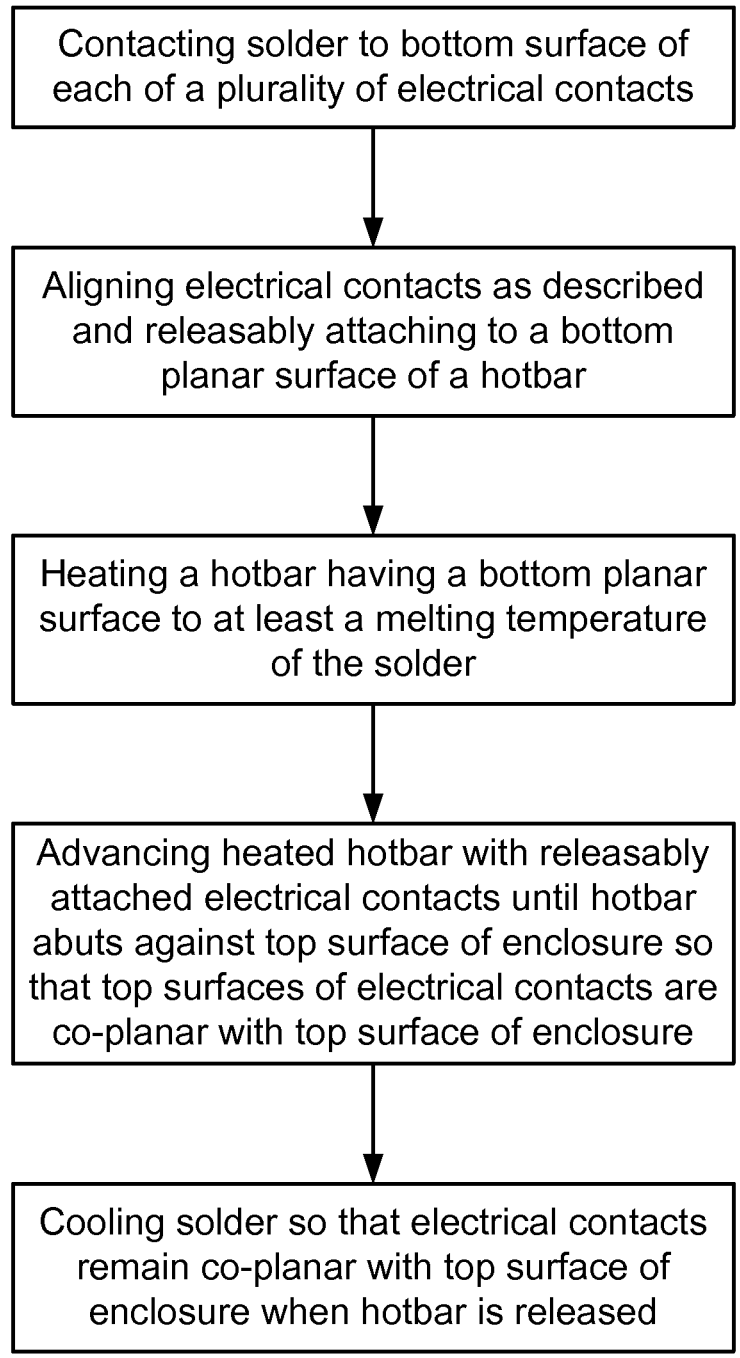

FIGS. 10-11 depict flowcharts of methods in accordance with many embodiments.

What is claimed is:

1. A method for assembling electrical contacts in an enclosure of a connector plug, the method comprising:
    contacting a bottom surface of each of a plurality of electrical contacts with at least one of a plurality of solder deposits;
    advancing a hotbar toward the plug enclosure so that a bottom planar surface of the hotbar abuts against a top surface of each of the plurality of electrical contacts so as to planarize the top surfaces of the electrical contacts with each other and with an outer surface of the connector plug while being positioned within the enclosure;
    heating the hotbar to at least a melting temperature of the solder;
    melting the solder deposit with the heated hotbar through the electrical contacts so as to solder the electrical contacts within the enclosure; and
    cooling the melted solder while the bottom planar surface of the hotbar remains abutted against the top surfaces of the plurality of electrical contacts so that the top surfaces of the electrical contacts remain co-planar when the hotbar is removed.

2. The method of claim 1, wherein contacting each of the electrical contacts with at least one of the plurality of solder deposits comprises positioning the plurality of electrical contacts at desired locations within the enclosure.

3. The method of claim 2, wherein positioning the electrical contacts at desired locations within the enclosure comprises arranging the electrical contacts in a frame.

4. The method of claim 2, wherein positioning the electrical contacts at desired locations comprises advancing the hotbar toward the enclosure so as to move the plurality of electrical contacts arranged in a frame into contact with the solder deposits within the enclosure.

5. The method of claim 3, further comprising:
    removing the frame before or after advancing the hotbar toward the enclosure.

6. The method of claim 1, wherein heating the hotbar occurs before, during or after advancing of the hotbar toward the plug enclosure.

7. The method of claim 1, further comprising:
    removing the hotbar from the enclosure after the melted solder is sufficiently cooled to remain co-planar.

8. The method of claim 1, further comprising:
    depositing solder at a plurality of desired solder point locations within the plug enclosure to form the plurality of solder deposits within the enclosure.

9. The method of claim 1, wherein contacting the at least one solder deposit with each electrical contact comprises depositing the at least one solder deposit directly on the bottom surface of each electrical contact.

10. The method of claim 1, further comprising:
    removably coupling the plurality of electrical contacts on the bottom planar surface of the hotbar so that the top surfaces of the electrical contacts are substantially co-planar with each other; and
    releasing the plurality of electrical contacts from the hotbar after soldering the electrical contacts within the enclosure.

11. The method of claim 10, wherein removably coupling the plurality of electrical contacts on the bottom planar surface of the hotbar comprises using a magnetic field to hold each of the plurality of electrical contacts at a desired location on the hotbar.

12. The method of claim 11, wherein the hotbar includes a magnet providing the magnetic field, wherein the magnet is a permanent magnet with a magnetic force less than a bonding force between the solder and the electrical contacts when cooled, and wherein releasing the plurality of electrical contacts from the hotbar comprises retracting the hotbar away from the enclosure.

13. The method of claim 11, wherein the hotbar includes an electro-magnet providing the magnetic field, wherein removably coupling the electrical contacts on the hotbar comprises energizing the electro-magnet, and wherein releasing the electrical contacts from the hotbar comprises de-energizing the electro-magnet prior to removing the hotbar from the enclosure.

14. A method for assembling electrical contacts in an enclosure of a connector plug, the enclosure having an opening sized to accept the electrical contacts, the method comprising:
    supporting a plurality of electrical contacts in a dielectric frame;
    inserting a printed circuit board having a plurality of bonding pads within the connector enclosure such that the bonding pads are positioned within the opening, wherein each of the plurality of electrical contacts has a corresponding bonding pad of the plurality of bonding pads;

depositing solder on each of the bonding pads;

placing the dielectric frame and supported electrical contacts in the opening such that a bottom surface of each of the plurality of electrical contacts comes in contact with the solder deposited on the corresponding bonding pad;

advancing a hotbar toward the plug enclosure so that a bottom planar surface of the hotbar abuts against a top surface of each of the plurality of electrical contacts and an outer surface of the connector enclosure so as to planarize the top surfaces of the electrical contacts with each other and with the outer surface of the connector plug;

heating the hotbar to at least a melting temperature of the solder to melt the solder and solder each electrical contact with the corresponding bonding pad within the enclosure; and cooling the melted solder while the bottom planar surface of the hotbar remains abutted against the top surfaces of the plurality of electrical contacts so that the top surfaces of the electrical contacts remain co-planar when the hotbar is removed.

15. The method of claim 14, further comprising:
after the hot bar is removed, applying overmolding within the opening and between each adjacent contact and between the contacts and surrounding connector enclosure so that an outer surface of the overmolding is flush with the top surfaces of the contacts and with the outer surface of the connector plug.

16. The method of claim 14, wherein the enclosure opening extends from a first side to a second, opposite side of the enclosure and the plurality of bonding pads of the printed circuit board includes a first set of bonding pads on a first side of the printed circuit board and a second set of bonding pads on a second side of the printed circuit board and the plurality of electrical contacts include a first group of electrical contacts corresponding to the first set of bonding pads and a second group of electrical contacts corresponding to the second set of bonding pads, the method further comprising:

positioning the printed circuit board inserted into the enclosure so that the first and second sets of bonding pads are aligned within the enclosure, wherein depositing solder deposits solder on each of the first and second sets of bonding pads and heating the hotbar solders each electrical contact of the first and second groups to the corresponding bonding pad.

17. A method for assembling electrical contacts in a connector, the method comprising:

contacting a bottom surface of each of a plurality of electrical contacts with at least one of a plurality of solder deposits;

removably coupling the plurality of electrical contacts on the bottom planar surface of the hotbar using a magnetic field to hold each of the plurality of electrical contacts at a desired location on the hotbar so that the top surfaces of the electrical contacts are substantially co-planar with each other; and advancing a hotbar toward the plug enclosure so that a bottom planar surface of the hotbar abuts against a top surface of each of the plurality of electrical contacts so as to planarize the top surfaces of the electrical contacts while being positioned on the connector;

heating the hotbar to at least a melting temperature of the solder;

melting the solder deposit with the heated hotbar through the electrical contacts so as to solder the electrical contacts on the connector; and cooling the melted solder while the bottom planar surface of the hotbar remains abutted against the top surfaces of the plurality of electrical contacts so that the top surfaces of the electrical contacts remain co-planar when the hotbar is removed.

18. The method of claim 17, further comprising:
releasing the plurality of electrical contacts from the hotbar after soldering the electrical contacts on the connector.

19. The method of claim 18, wherein releasing the plurality of electrical contacts from the hotbar after soldering the electrical contacts on the connector comprises withdrawing or de-activating the magnetic field.

20. The method of claim 17, wherein the hotbar includes a magnet providing the magnetic field, wherein the magnet is a permanent magnet with a magnetic force less than a bonding force between the solder and the electrical contacts when cooled.

21. The method of claim 20, further comprising:
releasing the plurality of electrical contacts from the hotbar by retracting the hotbar away from the enclosure.

22. The method of claim 17, wherein the hotbar includes an electro-magnet providing the magnetic field, wherein removably coupling the electrical contacts on the hotbar comprises energizing the electro-magnet.

23. The method of claim 22, further comprising:
releasing the electrical contacts from the hotbar comprises de-energizing the electro-magnet prior to removing the hotbar from the enclosure.

* * * * *